Oct. 13, 1953 G. W. BARNES, JR 2,655,426

ELECTRIC CONTROL CIRCUIT AND RECORDER

Original Filed April 12, 1944 6 Sheets-Sheet 1

INVENTOR.
GEORGE W. BARNES JR.
BY Arthur H. Swanson
ATTORNEY.

ELECTRIC CONTROL CIRCUIT AND RECORDER

Original Filed April 12, 1944

6 Sheets-Sheet 2

INVENTOR.
GEORGE W. BARNES JR.

BY Arthur H. Swainson

ATTORNEY.

Oct. 13, 1953 G. W. BARNES, JR 2,655,426

ELECTRIC CONTROL CIRCUIT AND RECORDER

Original Filed April 12, 1944 6 Sheets-Sheet 3

INVENTOR.
GEORGE W. BARNES JR.

BY Arthur H. Swanson

ATTORNEY.

INVENTOR.
GEORGE W. BARNES JR.
BY Arthur H. Swanson
ATTORNEY.

INVENTOR.
GEORGE W. BARNES JR.
BY Arthur H. Swenson
ATTORNEY.

Oct. 13, 1953 G. W. BARNES, JR 2,655,426

ELECTRIC CONTROL CIRCUIT AND RECORDER

Original Filed April 12, 1944 6 Sheets-Sheet 6

INVENTOR.
GEORGE W. BARNES JR.

BY
Arthur H. Swanson

ATTORNEY.

Patented Oct. 13, 1953

2,655,426

UNITED STATES PATENT OFFICE 2,655,426

ELECTRIC CONTROL CIRCUIT AND RECORDER

George W. Barnes, Jr., Clifton Heights, Pa., assignor, by mesne assignments, to Minneapolis-Honeywell Regulator Company, Minneapolis, Minn., a corporation of Delaware Original application April 12, 1944, Serial No. 530,611, now Patent No. 2,527,207, dated October 24, 1950. Divided and this application November 6, 1948, Serial No. 58,764

15 Claims. (Cl. 346—32)

Figures 1, 10, 11:
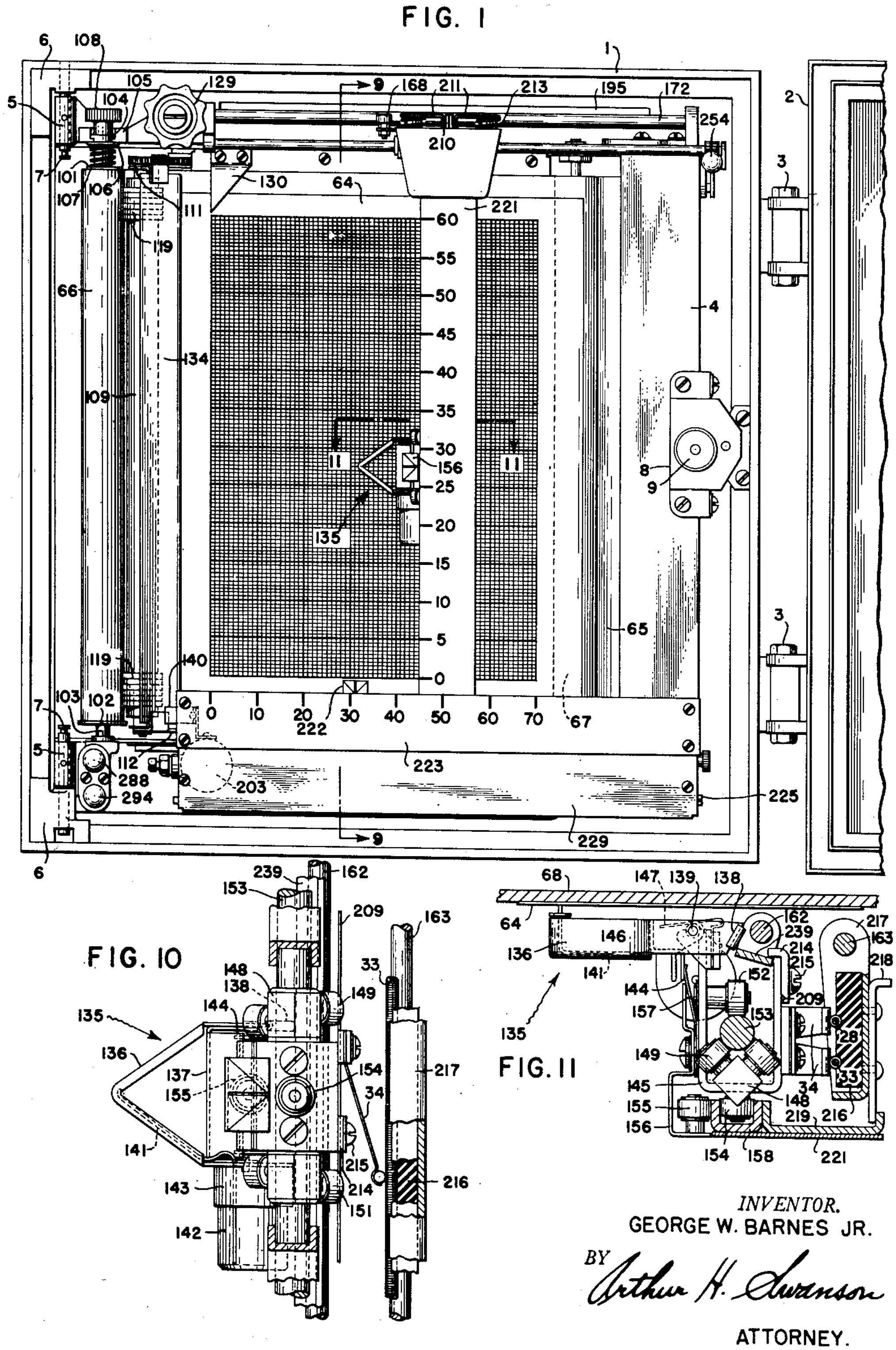

The present invention relates to recording instruments, and more particularly recording instruments that are used to make simultaneously records of the values of two conditions on rectangular coordinates.

In most recording instruments the value of a single condition is recorded against time by moving a marking element in one direction and moving the chart upon which the record is made at right angles thereto and at a constant speed. There are times, however, where it is more desirable to record the value of one condition with respect to the value of a second. In such a case a more complicated instrument is necessary since means must be provided for moving the marking element in two directions.

This application is a division of my copending application, Serial Number 530,611, filed April 12, 1944, now Patent 2,527,207, issued October 24, 1950. This application is more specifically directed to the combination of an electric control circuit and a recorder.

It is an object of the invention to provide an instrument in which the values of a plurality of variable conditions may be recorded simultaneously with a single recording element. It is a further object of the invention to provide an instrument in which a recording element is moved in one direction in response to variations in the value of one condition and in which the recording element is moved in a direction at right angles to the first direction in response to variations in the value of a second condition.

It is a further object of the invention to provide an instrument in which the value of one condition may be successively plotted against the values of a plurality of other conditions. In order that the various records made may be distinguished from each other a means is provided to give a characteristic marking to each of the records.

The instrument of the present invention is provided with a pair of motors each one of which, through suitable mechanism, serves to move the recording element across the chart in one direction. Each of these motors is controlled in its rotation by means of an amplifier that is responsive to the variations in a minute electric voltage. This voltage is directly responsive to variations in the condition being measured, such, for example, as the voltage produced by a thermocouple if temperature is being measured, or from a tachometer generator if speed is being measured. The chart upon which the record is made is drawn with rectilinear coordinates and is manually moved to bring a new surface under the recording element each time a record is to be made.

It will be obvious to those skilled in the art that any two variables may be plotted against each other such as temperature against pressure, speed against distance, specific gravity against flow, or other variables. This invention is more particularly interested with the recording mechanism, rather than the variables whose values are recorded.

The various features of novelty which characterize this invention are pointed out with particularity in the claims annexed to and forming a part of this specification. For a better understanding of the invention, however, its advantages and specific objects obtained with its use, reference should be made to the accompanying drawings and descriptive matter in which is illustrated and described a preferred embodiment of the invention.

Figure 2:
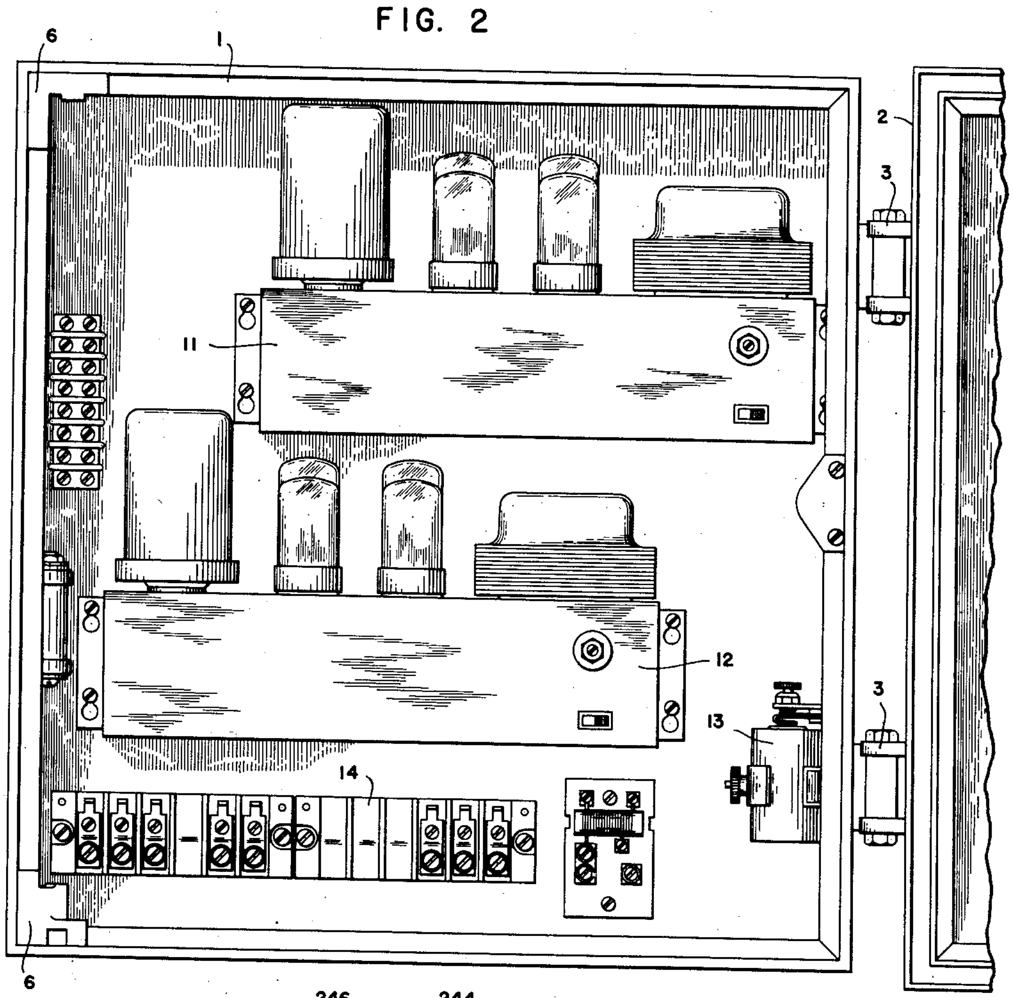
Figure 12:
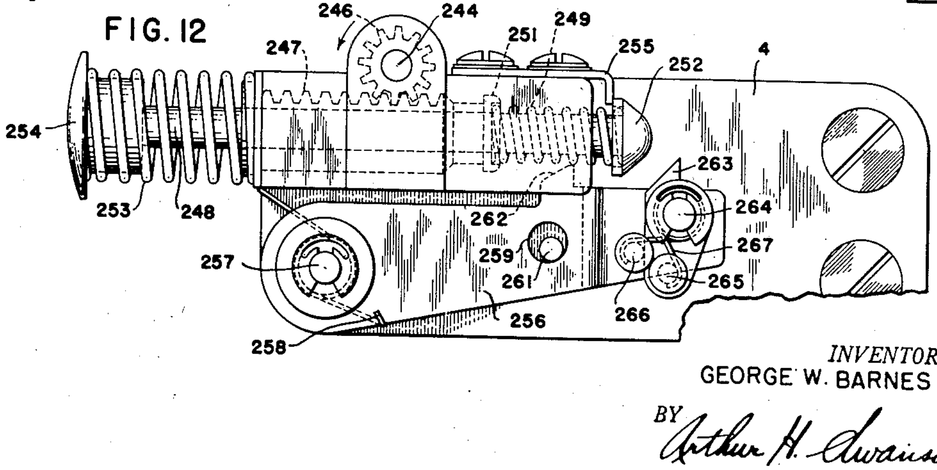
Figures 3, 13, 14:
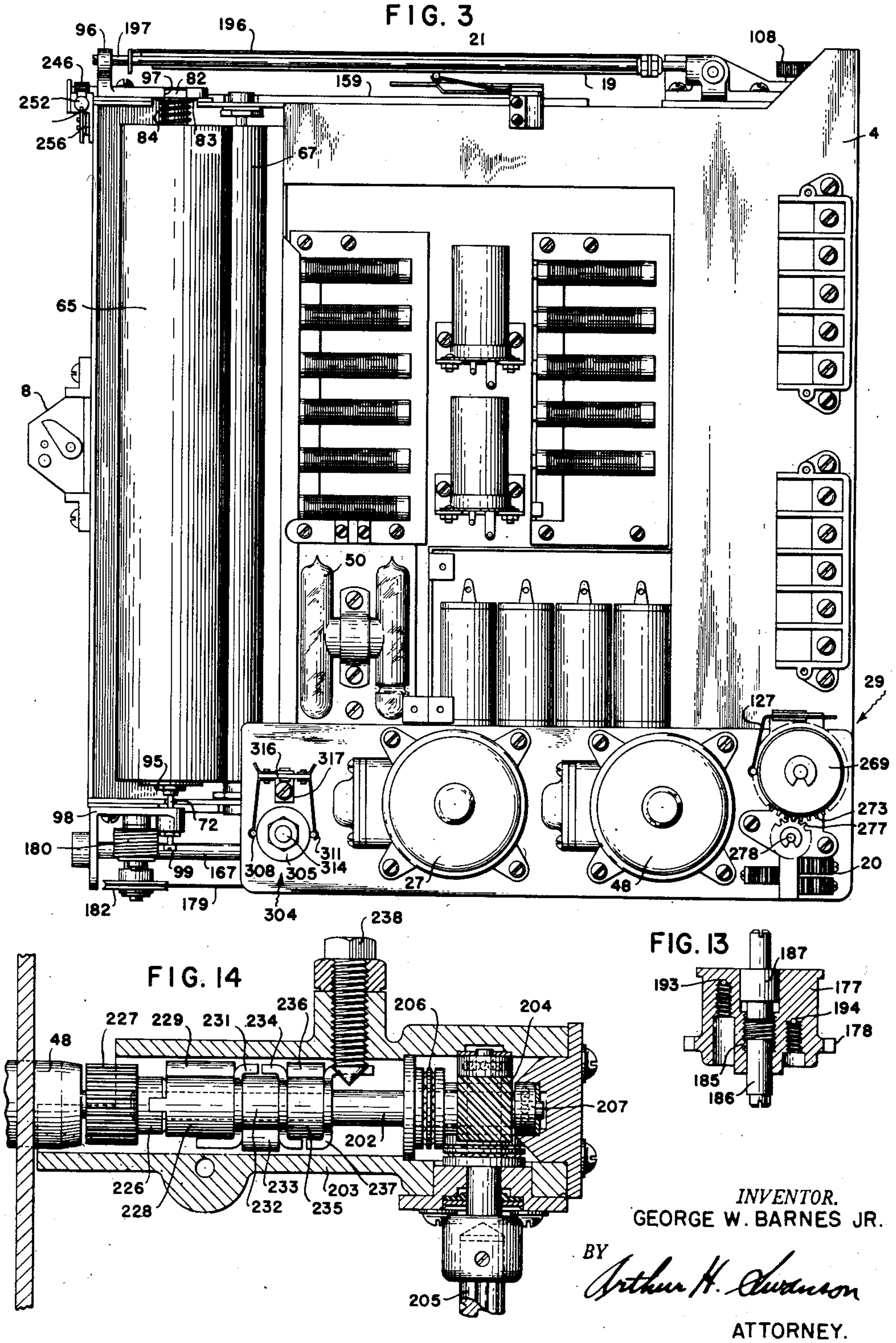
Figure 4:
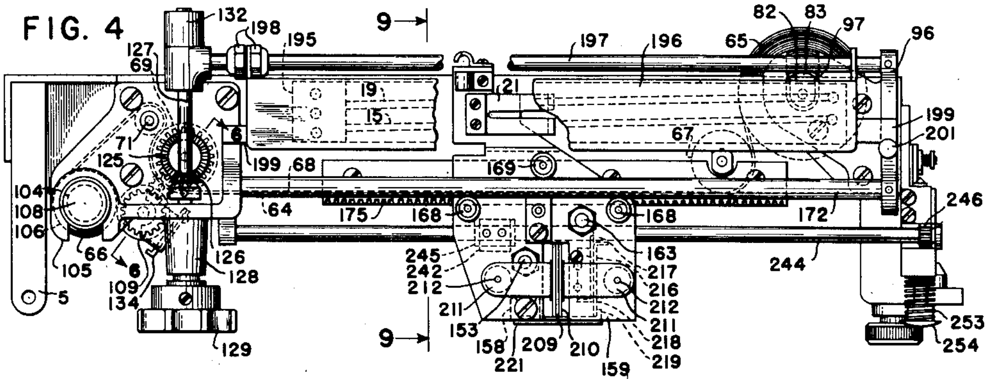
Figure 5:
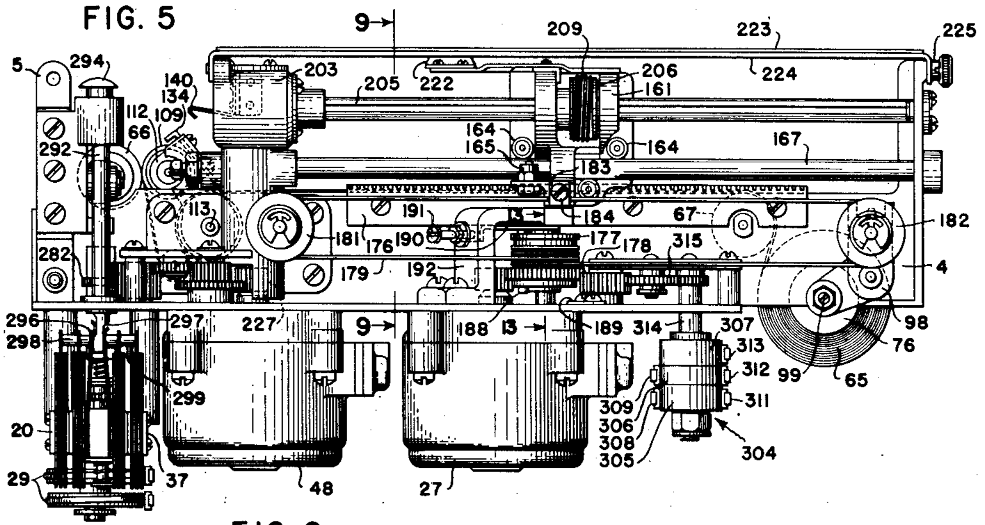
Figure 6:
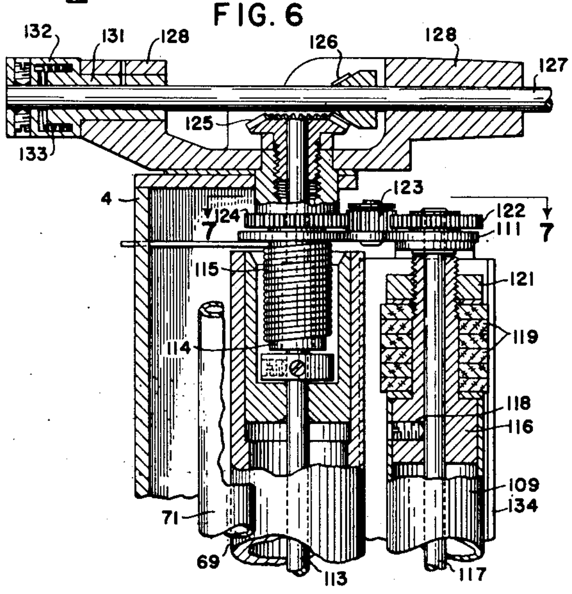
Figure 7:
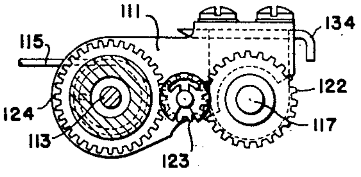
Figures 8, 9:
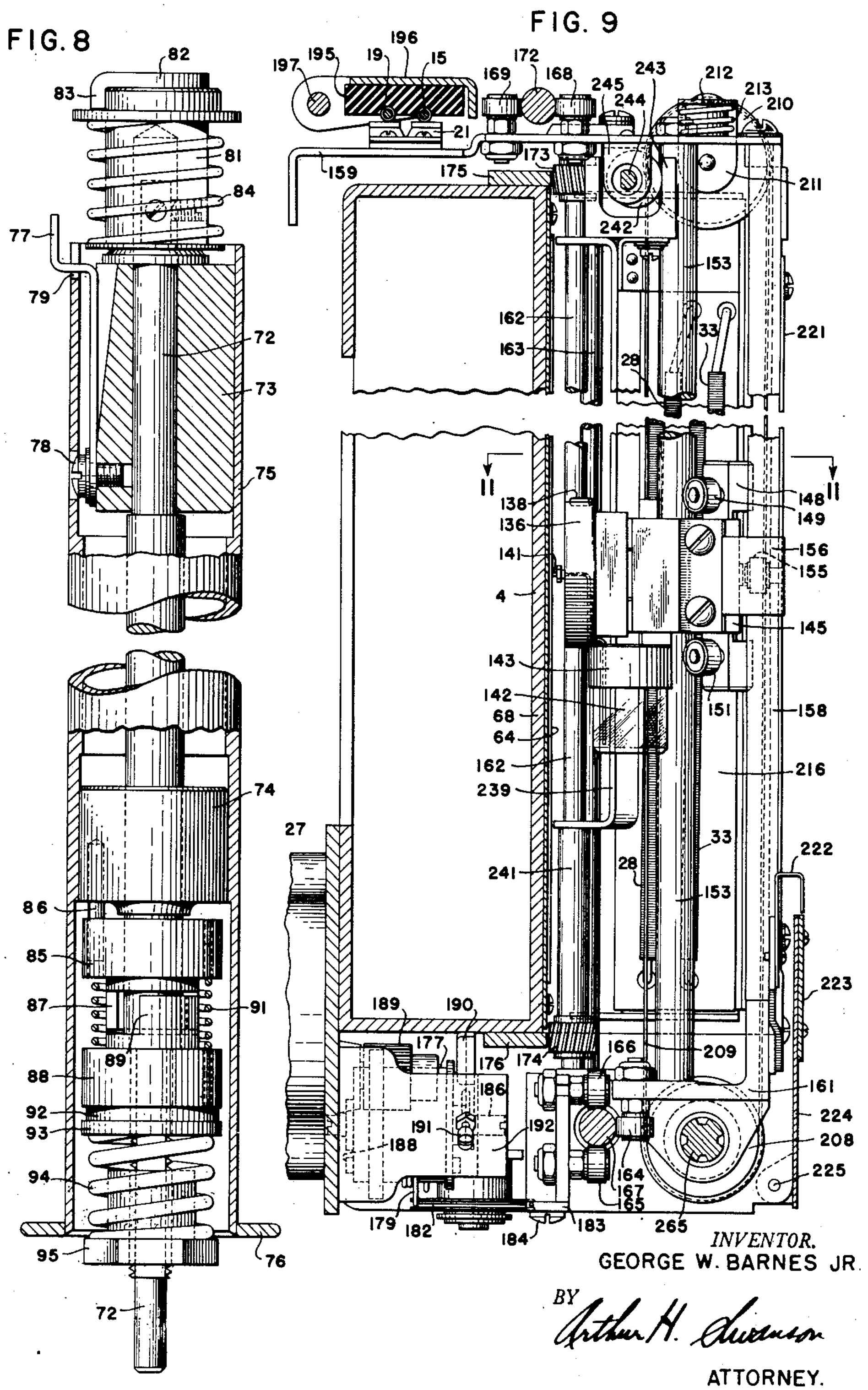
Figure 15:
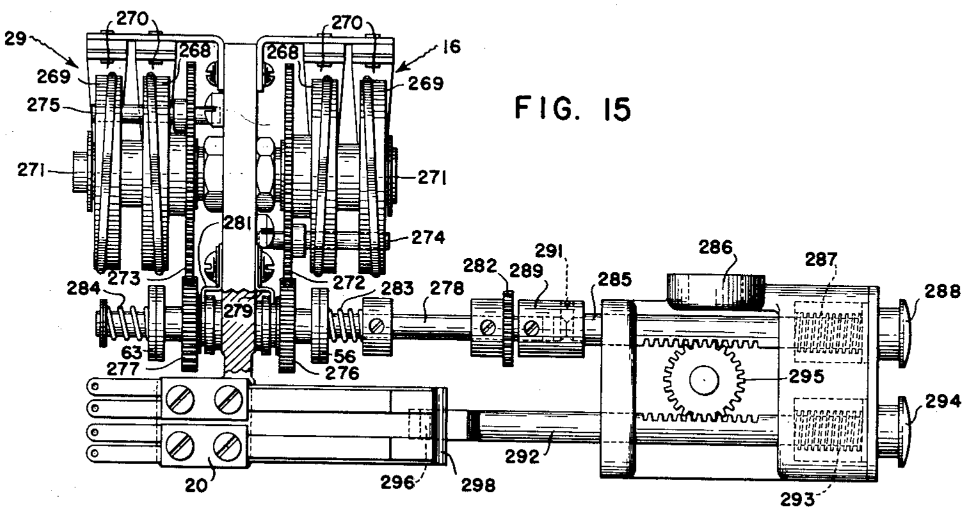
Figures 16, 17:
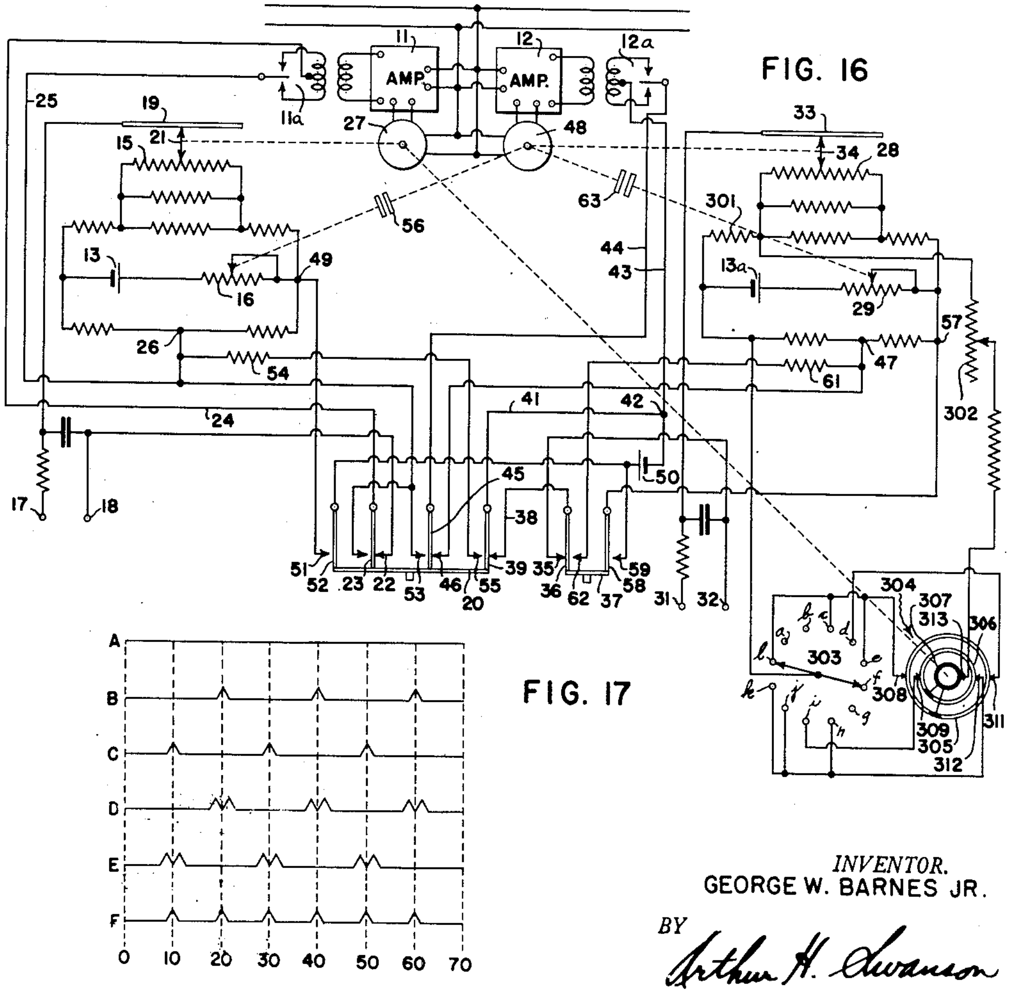

In the drawings;

Figure 1 shows a front view of the instrument with the casing door open,

Figure 2 is a view of the instrument casing with the chassis swung out of position, Figure 3 is a back view of the mechanism supported on the chassis, Figure 4 is a top view of the chassis, Figure 5 is a bottom view of the chassis, Figure 6 is a view of the paper feeding rolls taken on line 6—6 of Figure 4, Figure 7 is a view taken on line 7—7 of Figure 6, Figure 8 is a sectional view of the chart supporting roll, Figure 9 is a view taken on line 9—9 shown in Figures 1, 4 and 5, Figure 10 is an enlarged front view of the pen supporting carriage, Figure 11 is a top view of the pen supporting carriage taken on line 11—11 shown in Figures 1 and 9, Figure 12 is a view of the actuating mechanism for the pen lifter, Figure 13 is a sectional view taken on line 13—13 of Figure 5, Figure 14 is a view in section of a portion of the vertical driving mechanism, Figure 15 is a view of the standardizing mechanism, Figure 16 is a wiring diagram for the measuring circuits, and Figure 17 is a view showing the chart record identifying system.

Referring first to Figures 1 and 2, there is shown an instrument casing 1 which is rectangular in shape and which has a door 2 mounted thereon by hinges 3. The door is shown in its open position so that the parts within the casing may be seen. The chart supporting mechanism and the recording mechanism are both mounted on a chassis 4 that is swingably mounted in the instrument casing. To this end the chassis is provided with hinge members 5 that cooperate with hinge members 6 on the casing. Hinge pins 7 extend through the members 5 and 6, so that the chassis is pivotally mounted. The chassis is held in position in the casing 2 by means of a lock 8 that is actuated by a knob 9.

When the lock is released and the chassis is swung out of the case, the interior of the casing will be exposed as shown in Figure 2. In this figure there is shown a pair of amplifiers 11 and 12 that are mounted upon the back of the casing. Mounted upon the side wall of the casing in line with each other are dry cells 13, one of which is used with each of the amplifiers. A series of terminal blocks 14 are also attached to the back of the casing so that the various electric connections may easily be made. In the drawings the wires which extend between the various parts of the instrument are omitted for the sake of clearness; the connections, however, are similar to those which are shown in the wiring diagram of Figure 16. The case is deep enough and the parts are so arranged on it and on the chassis that they do not conflict with each other when the chassis is swung into its position in the case.

Each of the amplifying units forms part of a complete potentiometer type circuit of the kind disclosed and claimed in the application of Walter P. Wills, Serial Number 421,173, filed on December 1, 1941, now Patent 2,423,540, issued July 8, 1947. These circuits are, however, connected in a novel manner so that the amplifying unit for one circuit may be used to standardize both circuits. The type of primary measuring element used has not been shown since it is immaterial, and may be responsive to any variable as long as a voltage varying in accordance with the value of the variable is produced. For example, for purposes of this description only, it may be assumed that a graph is being made of temperature plotted against pressure, with temperature as the ordinate and pressure as the abscissa.

The potentiometer circuit or network on the left in Figure 16 is normally connected with the amplifier 11. This circuit is provided with a slidewire 15 across which is impressed a potential by one of the batteries 13. As the battery voltage decreases with use the potential may be adjusted to a constant value by means of a variable resistance 16. An unknown voltage proportional to the variable is impressed across the slidewire in opposition to the known voltage. This unknown voltage is applied to terminals 17 and 18. From terminal 17 connection is made direct to a collector bar 19 and a contact 21 to the slidewire 15. From terminal 18 connection is made through stationary contact 22, movable contact 23, of a switch 20, and wire 24 to a center tap on the primary of a transformer forming part of a converter 11*a* that is built into amplifier 11. Connection is made from the converter, by wire 25 to a point 26 in the potentiometer network. When the potentiometer network is unbalanced due to a change in the input voltage, this unbalance is detected by the converter and amplified in a manner set forth in the above mentioned Wills application to energize a motor 27 for rotation in a direction dependent upon the network unbalance. As the motor 27 rotates it moves the contact 21 along the slidewire 15 and collector bar 19 in a direction and amount to rebalance the network and simultaneously adjusts a recording element.

The potentiometer network on the right of Figure 16 is similar to that on the left in that it is provided with a slidewire 28 across which a known voltage is impressed by a battery 13*a*, the voltage being kept constant as the battery diminishes by a rheostat 29. The unknown voltage is applied to terminals 31 and 32, the former of which is connected directly with a collector bar 33 and movable contact 34. The terminal 32 is connected through stationary contact 35 and movable contact 36, of a switch 37, stationary contact 38 and movable contact 39 of the switch 20, wire 41, junction 42 and wire 43 to the center tap of the primary winding of a transformer forming part of a converter 12*a* of the amplifier 12. From the converter connection is made through wire 44 to a movable contact 45 and a stationary contact 46 of the switch 20 to a point 47 of the potentiometer network. As the network is unbalanced a motor 48 will be energized for rotation in one direction or the other by amplifier 12 to shift contact 34 along the slidewire 28 and the collector bar 33 to a position in which the network is again balanced, and to simultaneously shift the recording element in a direction at right angles to the direction in which it was moved by motor 27.

In the normal operation of the instruments the circuit connections are as shown in Figure 16. From time to time, as the batteries 13 diminish in strength the networks must be recalibrated or standardized by adjusting the resistances 16 and 29. When this is done the potentiometer circuits are disconnected from the input terminals 17 and 18, and 31 and 32 respectively, and have a standard cell 50 connected across a portion thereof. The same amplifier is used for both potentiometer networks during the standardizing operation.

To standardize the left network, the movable contacts of switch 20 are moved to the left by a bar that connects them. When this is done the converter 12*a* and standard cell 50 are connected in that circuit between points 49 and 26 by a connection including a wire extending from point 49 to a stationary contact 51, movable contact 52, cell 50, junction 42, and wire 43 to the transformer of converter 12*a*. From the converter the connection extends through wire 44, movable contact 45, and a stationary contact 53 to the junction point 26. At the same time this is done a resistance 54 is shunted across the converter 12*a*. The circuit for this is from junction 42, wire 41, movable contact 39, and stationary contact 55 to resistance 54 and junction 26. The same operation that moves the contacts of switch 20 to the left is used to close a clutch 56, so that as motor 48 is rotated due to unbalance of the left potentiometer network the standardizing resistance 16 will be adjusted by it in a direction to recalibrate the network.

In standardizing the right network, the input thereto is disconnected and standard cell 50 and converter 12*a* are connected across points 47 and 57 by shifting the movable contacts of switch 37 to the right. The circuit for this operation is from point 57 to movable contact 58, of switch 37, stationary contact 59, cell 50, junction 42 and wire 43 to the converter. From the converter the circuit includes wire 44, movable contact 45 and stationary contact 46 to point 47. At the same time a resistance 61 is shunted across the converter by a circuit extending from point 47 through the resistance 61, stationary contact 62, movable contact 36 of switch 37, stationary contact 38 and movable contact 39 of switch 20 and wire 41 to junction 42. The operation of moving the contacts of switch 37 to the right is also used to close a clutch 63 so that rotation of motor 48, due to network unbalance, may be used to adjust the resistance 29 and recalibrate the network.

As the networks rebalance themselves and cause the motors 27 and 48 to rotate, these motors through mechanism to be described later, move a recording element across a chart. The chart in this case is numbered 64 and is shown as being in strip chart form and upon which are printed a plurality of individual charts made up of rectilinear coordinates. The chart supply roll 65, as best shown in Figure 4, is mounted on one side of the chassis 4 while the take-up roll is mounted at 66 on the other side of the chassis. On its way from the supply roll to the take-up roll the chart passes a guide roll 67 which guides it across the front of a platen 68 to a guide roll 69 and a second guide roll 71. Thus the chart is moved from one side of the chassis to the other across the front of a writing platen which serves to back up the chart while a record is being made upon it. The various resistances and condensers necessary for the potentiometer networks and the standard cell 50 are mounted on suitable supports provided on the back of the chassis 4 as shown in Figure 3. For the sake of clearness, no wiring is shown in that figure.

The supply roll 65 is mounted upon a core which is so designed that a slight tendency to rewind the chart upon this roll is at all times present, which tendency can be overcome by the slipping of a friction clutch when the chart is moved. Thus the chart is at all times held under tension so that the portion thereof in front of the platen will always be taut. As shown in Figure 8, the supply roll support consists of a shaft 72 upon the upper end of which is rotatably mounted an elongated collar 73 and upon the lower portion of which is mounted a second collar 74. These collars serve to support a drum 75 that has rigidly fastened to its lower end a flange 76. The chart supply roll is mounted on the drum 75 and is kept from rotating with respect thereto by means of a spring 77 whose upper end is adapted to be received in the usual notch formed in the core of the chart roll. This spring is attached to the collar 73 by means of a screw 78 and its upper end extends through a notch 79 formed in the surface of the drum 75. The upper end of the shaft 72 has non-rotatably mounted on it a collar 81 that is provided with an enlarged upper portion on the top surface of which is fastened a member 82 having flat sides. Slidably mounted on the collar 81 is a disc 83 which is pressed upwardly into engagement with the lower surface of the enlarged upper portion of the collar by means of a spring 84. Shaft 72 also has rotatable upon it one member 85 of a jaw clutch that is attached by a pin 86 to the collar 74. The member 85 has a jaw 87 projecting downwardly from it which is adapted to engage a jaw 89 projecting upwardly from a second clutch member 88 that is also freely rotatable upon the shaft 72. These clutch members are normally maintained in the relation shown, in which the jaws 87 and 89 do not engage each other, by means of a torsion spring 91 that has one end projecting into the clutch member 85 and the other end projecting into the clutch member 88. Engaging the lower surface of the member 88 is a disc 92 of friction material that is pressed upwardly into engagement with the member 88 by means of a disc 93 that is slidably received on the lower end of the shaft 72. The shaft at this point is provided with flats on its surface with which the disc 93 cooperates so that it will not rotate relative thereto. Clutch member 88, disc 92 and disc 93 are forced into engagement with each other by means of spring 94, whose tension can be adjusted by a nut 95 that is threaded upon the shaft 72.

After the supply roll 65 has been placed on drum 75 with spring 77 in a notch in the roll core, the assembly is placed in position in the chassis (Figs. 3 and 4) with part 82 received in a slot 97 formed in a bracket 96 attached to the top of the chassis. The lower end of shaft 72 is received by an opening in a bracket 98 attached to the lower end of the chassis. The chart roll is maintained in the proper vertical position by a screw 99 that is threaded into the bottom of bracket 98 to limit the downward movement of shaft 72. Washer 83 bearing against the lower surface of bracket 96 under the force of spring 84 assists gravity in holding the assembly in position.

In operation, as the chart is moved across the surface of the platen the chart roll will cause the drum 75 to rotate with it. As the drum rotates it will first move clutch member 85 until the jaw 87 thereof engages the jaw 89 of clutch member 88. Thereafter, the clutch member 88 will also be moved against the friction provided by the engagement between its lower face and the friction disc 92. When the chart has stopped being moved, spring 91 will tend to unwind itself to separate jaws 87 and 89 and thereby place the chart under tension. From the above it will be seen that when the chart is initially moved, the spring 91 is placed under tension and thereafter the chart drum 75 will be rotated against the friction of the disc 92. When the chart is no longer moved, clutch member 88 will remain in its new position and the spring 91 will place the chart under tension.

The take-up roll 66 (Fig. 1) is placed on a drum 101 and is held in position thereon by a flange 102 on the lower end of the drum against which the roll rests. Drum 101 is fastened to a shaft 103 passing through it, which shaft has a collar 104 rotatably mounted on its upper end. In mounting the assembly in the instrument the collar is placed in a suitable holder 105 attached to the chassis with the lower end of shaft 103 in a suitable bearing in the frame. Collar 104 is held in the frame 105 by means of a collar 106 that bears against the bottom of the frame under the force of a spring 107. If desired the take-up roll can be rotated manually by means of a knob 108, but the take-up roll is ordinarily driven by frictional engagement between its surface and the surface of a friction driving roller 109.

The friction drive roll 109 (Figs. 4 to 7) is rotatably supported in an upper arm 111 and a lower arm 112, which arms are pivotally mounted on a vertically extending shaft 113. In order that the arms may have a good bearing on shaft 113 each of them has a sleeve attached to it through which the shaft extends. One of these sleeves is shown at 114 in Figure 6 as being attached to arm 111. It is noted that guide roller 69 is also mounted to rotate around shaft 113 and is therefore provided with bearings that surround the shaft, one of which is shown in Figure 6 below sleeve 114.

Normally the friction roll 109 is spring pressed into engagement with the surface of the take-up roll 66 so that upon rotation of the friction roll 109 the take-up roll will be rotated also. To this end a spring 115 is wrapped around the sleeve 114 and has one end attached thereto, while the other end bears on a portion of the chassis 4. This spring serves to force the arms 111 and 112 on a clockwise direction in Figure 4.

A special construction is used on the upper and lower ends of roll 109 to make sure that there will be sufficient friction between that roll and the take-up roll 66 to drive the latter. Since the upper and lower ends of the friction driving roll are made in exactly the same manner, only the upper end thereof is shown in section in Figure 6. It will be seen that this driving roll is mounted upon sleeves 116 that are in turn attached to a shaft 117 by means of a set screw 118. The shaft 117 is suitably journaled for rotation in arms 111 and 112. The upper end of the sleeve 116 is reduced in diameter as shown, and has placed upon it a number of friction discs 119 that may be made of some material such as composition cork or fibre. These discs are tightly held in engagement with the sleeve 116 by means of a nut 121 that is threaded upon the upper end of the sleeve. The discs 119 are slightly larger in diameter than the roller 109 so that as the roller is rotated, these discs will bear upon the surface of the take-up roll to drive the same. Due to their friction characteristics, there will be no slippage between the take-up roll and the friction driving roll.

Rotation is imparted to the driving roll 109 by means of a gear 122 fastened to the upper end of the shaft 117. This gear meshes with a pinion 123 mounted on the arm 111, which pinion in turn is driven by gear 124. As shown in Figure 6, this gear has a tubular extension that is journaled in the chassis 4 and which is attached to a bevel pinion 125. The upper end of shaft 113 is received by the bevel pinion which acts as a bearing therefor. The pinion 125 meshes with a second beveled pinion 126 that is attached to a shaft 127 which is journaled in bearings 128. In the operation of the device, a knob 129 on the front end of shaft 127 is rotated to rotate the pinion 126, and the various gears forming the gear train between that pinion and gear 122, so that the drum 109 can be rotated to drive the take-up roll.

Normally the knob 129 is rotated in a direction so that the chart will be wound up on the roll 66. In order to prevent retrograde movement of the roll 109, the shaft 127 has mounted on it what is, in effect, a one-way brake. To this end the rear bearing 128 for the shaft 127 has in it a hardened steel bushing 131 that receives the shaft. Mounted on the outer end of the shaft is a cup shaped member 132 of such a diameter that an annular space is left between this member and bushing 131. Within this space is a coil spring 133 that loosely encircles the bushing and which has one end attached to the cup shaped member. This spring is wound in such a direction that upon rotation of the shaft 127 in a direction to feed the chart to roller 66, the spring will tend to expand into engagement with the inner surface of the cup member. Upon rotation of the shaft 127 in a reverse direction, however, the spring 123 will grab the outer surface of the bushing 131 to prevent or retard rotation of the shaft 127 in that direction. From the above it will be seen that since the friction roller 109 cannot turn in a reverse direction, the spring 91 in the supply roll can pull the chart tight without having a tendency to unwind it from the take-up roll.

At times it may be desirable to tear off each of the sections of the chart after it has had a record drawn upon it, rather than saving all of these sections in a roll. If this is the case, the chart will be directed from the guide roll 71, as seen in Figure 4, between the drum upon which the take-up roll is normally mounted and the friction driving drum 109, around in front of that driving roll and behind a cutter member 134. When this type of chart drive is used, the chart is pinched between the take-up roll and drive roll 109 to be fed forwardly below the cutting edge. When the chart has been advanced sufficiently, it may be pulled downwardly against the cutting edge to be torn off in sections. An indicator 130 on the chassis (Fig. 1) cooperates with the chart to show when it is properly positioned.

In order to simplify the attaching of the chart to the take-up roll and the threading of the chart around guide rollers 69 and 71, a means is provided to hold the friction drive roll 109 out of engagement with the take-up roll 66. For this purpose a hook 140 (Figs. 1 and 5) is fastened to the lower portion of the chassis back of scale 223. When a new chart is to be placed in the instrument the friction drive roll 109 is moved clockwise in Figure 5 against the force of spring 115 until the hook 140 is engaged behind the bent edge of the cutter bar 134. The friction drive roll will then be held in inactive position until it is released by removing the hook from the cutter bar.

The pen which is used to make a record on the chart is mounted on a vertically movable carriage that is in turn mounted on a horizontally movable frame. Because of this type of mounting the pen can be moved in any direction across the chart to record the varying values of the two conditions that are being measured. As shown in Figures 1, 10 and 11, the pen 135 comprises an angle member 136 that is made of thin sheet metal which is bent as shown in Figure 10. The ends of this angle member are attached to a frame 137 whose rear ends extend to the right in Figure 11 and terminate at an angle as shown at 138. A combination reinforcing and pivot pin 139 joins the upper and lower portions of the frame. The writing point for the pen is formed by the end of a piece of capillary tubing 141 which extends rearwardly into engagement with the chart at the angle formed in the member 136. From its writing tip, the capillary tube extends down through the lower arm of the angle member and into a transparent ink receiving container 142. This container or cup is suitably fastened into a holder 143 which is attached to the lower end of the frame 137. The pen frame is also provided with a forwardly extending part 144, the purpose of which will be pointed out later.

A pen carriage is provided upon which the pen is mounted and has its frame member formed of a U-shaped part 145. Attached to the end of one of the legs of the U is a pair of brackets 146 which are mounted one above the other at a distance apart, so that they come just inside the ends of the frame member 137 of the pen. Also attached to this end of the U member 145 is a spring 147 which extends across in front of the brackets 146. The pen is mounted on the pen carriage, as best shown in Figure 11, by moving the pen into engagement with the spring 147, and then to the right along this spring until the pivot pin 139 moves under and into engagement with a notch formed in the brackets 146. The pen is then held in position with the pivot pin being pressed into engagement with the brackets 146 by the spring 147 as is best shown in Figure 11.

In order to guide the pen carriage in its vertical movement a block 148 is attached to the cross member of the U 145. This block has a pair of rollers 149 on its upper end and a pair of rollers 151 on its lower end which rollers, along with a third roller 152 located in a vertical position midway between rollers 149 and 151, engage a vertically extending rod 153.

The carriage is also provided with a pair of front rollers 154 and 155, the latter of which is supported on the pen carriage by means of a supporting member 156 that is attached to the U-shaped member by suitable screws. It is noted that these screws also hold a spring 157 which is adapted to bear against the right face of the part 144 on the pen to force the pen in a clockwise direction around the pivot pin 139 into engagement with the chart. Rollers 154 and 155 engage one of the flanges of a channel member 158 which extends in a vertical direction and is parallel to the rod 153. It will be seen that the cooperation of the various rollers with the rod and with the channel hold the pen carriage in a predetermined position relative to the chart so that the pen will at all times engage the chart as the pen carriage is raised and lowered.

Rod 153 and channel 158 form part of a movable frame upon which the pen carriage is mounted, which frame is adapted to be moved transversely of the instrument from left to right in Figure 1. The frame, as seen in Figure 9, consists of an upper plate member 159 and a lower casting 161 to which the rod and channel member are fastened. The plate and casting also have extending between them two other rods, 162 and 163. The frame is supported in a fixed vertical position by rollers 165 and 166 which bear against the top and bottom of a horizontally extending rod 167. There is also provided a plurality of rollers 164 which bear against the sides of rod 167 to definitely locate the path through which the frame will move. The upper end of the frame is restrained to move through a given path by means of rollers 168 and 169 which bear against the front and back of a rod 172 that extends transversely of the frame parallel to the rod 167. In order to keep the frame aligned vertically and to make sure that the upper end of the frame is exactly above the lower end of the frame as it is moved across the instrument, the rod 162 is rotatably mounted in the frame and is provided on its ends with pinions 173 and 174 which mesh respectively with racks 175 and 176 (Figure 9) that are attached to the chassis 4 above and below the writing platen. Therefore, as the frame is moved across the front of the instrument, the engagement between the racks and pinions will insure a continued vertical position of the same.

The frame carrying the pen carriage and pen is moved horizontally across the front of instrument by means of the motor 27 in response to unbalance of the left hand potentiometer network in Figure 16. To this end, the motor 27 is attached to the lower part of the chassis 4, on the back thereof, as shown in Figures 3 and 5. As the motor rotates, it drives a pulley 177 through suitable gearing, including a gear 178 that is formed on the pulley. Rotation of the pulley is transferred to the frame by means of a cable 179 which has its ends wrapped around and attached to the pulley 177. The central part of the cable extends from the lower surface of the pulley around guide pulleys 181 and 182, the latter of which is biased in a clockwise direction in Figure 5 by a spring 180 (Fig. 3) in order to keep the cable under tension. Movement of the cable as the pulley 177 rotates is imparted to the frame due to the fact that the cable is attached to the casting 161 of the frame by means of a block 183 which grips the cable between itself and the casting. A screw 184 is provided for this purpose.

As the pulley 177 is rotated by the motor 27, it is shifted axially so that the cable will be fed on and off of the pulley in a helix. This prevents the convolutions of cable from piling up on one another and binding. In order that the pulley may be shifted axially as it rotates, it is provided, as shown in Figure 13, with internal screw threads 185 that engage similar threads on a shaft 186 around which the pulley rotates. This shaft is held against rotation in its mounting in the instrument. The shaft is mounted by having one end placed through an opening in the chassis 4 and its other end placed in an opening in a bracket 192 that is attached to the chassis, as best shown in Figure 5. The shaft is provided with an enlarged portion 187 on one end which serves to help support the pulley and hold it rigid as it rotates. Extending through the pulley 177 and projecting from both ends thereof is a stop pin 188 that serves to positively limit the number of revolutions which may be imparted to the pulley as it rotates. If the pulley is rotating in a direction to move the frame to the right in Figure 5, the screw threads are such that it will be moved downwardly since the cable will be fed on from the right and off from the left. When the frame has reached the end of its travel the lower end of pin 188 will engage stop 189. If the frame is moving in the other direction or to the left in Figure 5, the pulley 177 will be moved upwardly until the upper end of the pin 188 engages against the stop 190. Since it is necessary that the movement of the frame be limited to exactly the extent of the calibrated portion of the chart, one of the stops, and in this case the stop 190, is made adjustable by means of a screw 191 that extends through the bracket 192. In adjusting the above described mechanism the pulley 177 is rotated until the lower end of pin 188 engages stop 189. The frame is then attached to the cable with the frame in a position so that the recording tip of the pen is on one edge of the calibrated portion of the chart. The motor 27 is then energized for rotation to move the frame in the opposite direction until the recording tip of the pen engages the other end of the calibrated portion of the chart. This is approximately three and one half rotations of the drum 177 and its diameter is made so that this is the case. In order to definitely limit the travel of the frame at this point the screw 191 is adjusted to move stop 190 into engagement with the pin 188.

From an inspection of Figure 13, it will be seen that the pulley 177 is also provided with openings 193 and 194. These openings are intended to receive the ends of the cable so that the cable ends may be clamped in the pulley by screws that are threaded through suitable openings in the pulley that are transverse to them. The cable ends are initially pulled tight enough so that spring 180 will be under tension thereby keeping the cable taut.

As has been pointed out above, the movable frame is moved transversely of the instrument when the potentiometer network is unbalanced. This movement continues until the network is rebalanced, and the balance point is determined by the proper position of contact 21 along slide-wire 15 and collector bar 19. To this end the contact 21 is resiliently mounted on the upper plate 159 of the frame as shown in Figure 9. The slide-wire 15 and collector bar 19 are mounted above the contact in an insulating block 195 that is in turn fastened to a support 196. This support is pivoted on a shaft 197 extending transversely of the chassis in such a fashion that the slide-wire and collector bar are directly above the contact. Since it is necessary that the slide-wire be given some particular position above the contacts, stop nuts 198 are threaded on the shaft 197 to positively position the left end of the support 196 as is shown in Figure 4. The frame 196 is definitely located above the contact by engagement between projections 199 extending from each end thereof and the upper surface of the chassis 4, and is kept in this position by a screw 201 which engages the right extension 199. In order to clean the slide-wire from time to time the frame may be swung around shaft 197 as a pivot after screw 201 has been removed. This positions the slide-wire support so that the slide-wire is facing upward in an accessible position.

The pen carriage is moved vertically on the shiftable frame by the motor 48 in response to unbalance of the right hand potentiometer network in Figure 16. For this purpose, the motor is mounted on the lower portion of the chassis 4 and over to one side beyond the travel of the frame. As best shown in Figure 14, the motor drives a shaft 202 which is received in a housing 203. The outer end of the shaft has a spiral gear 204 on it which meshes with a similar spiral gear fastened to a splined shaft 205, the latter shaft extending transversely across the lower portion of the chassis of the instrument and journaled for rotation therein. It is noted that the shaft 202 is provided with suitable thrust bearings 206 and 207 and that the shaft 205 is provided with similar bearings which are not numbered. As the splined shaft 205 rotates, it rotates a pulley 208, as shown in Figures 5 and 9, which pulley is slidably received on the shaft 205 and is moved along the shaft as the frame moves by portions of the casting 161 which engage its sides. The pen carriage is raised and lowered by a cable 209 which has its ends fastened to pulley 208. The center portion of the cable passes over a pulley 210 as shown in Figure 9, which pulley is mounted in the upper portion of the movable frame by means of a pair of angle brackets 211 that are located on top of the plate 159 by means of pins 212. Pulley 210 is normally biased in an upward direction in order to maintain the cable 209 under tension by a pair of springs 213 which surround the pins 212 and are located between the upper surface of plate 159 and the lower surface of the angle brackets 211. As the cable is driven it moves the pen carriage by a clamp 214 that holds the cable tightly against the carriage and a screw 215 that serves to hold the clamp in place.

Unbalance of the potentiometer network causes the motor 48 to start rotating to raise or lower the pen carriage. When the potentiometer network has been rebalanced the motor will stop rotating. To this end the contact 34 is attached to the side of the pen carriage and extends into engagement with the slide-wire 33 and collector bar 28 that are mounted on a vertically positioned insulating block 216. This block is fastened to a support 217 that is pivoted to move around the shaft 163. Normally the support is held in the position shown in Figure 11 by means of a latch including a finger 218 that is slidably mounted on the support and which finger engages the turned up edge of a bracket 219 that is attached to the channel 153. The resiliency of the contact 34 bearing against the slide-wire tends to move the support 217 in a counter-clockwise direction in Figure 11 until the latch 218 engages the bracket 219. In this manner the slide-wire is definitely positioned relative to the contact. By moving the latch 218 upwardly in Figure 11, its lower end will be brought out of engagement with the bracket 219, and the entire slide-wire assembly may be moved to a position in which it is accessible for cleaning.

It is noted that the holder 156 for roller 155 serves as a pointer to indicate the position of the carriage along a scale 221 that is attached to the front portion of the channel member 153 and the bracket 219. It is also noted that the frame has on it a pointer 222 which cooperates with a scale 223 that extends across the lower portion of the instrument to show the position of the frame with respect to the chart. The scale 223 is attached to a frame member 224 that is pivoted on the lower part of the chassis at 225. Thus the frame and the scale carried by it may be moved in a clockwise direction in Figure 9 to give access to the mechanism on the lower part of the chassis.

A stop is provided to limit the rotation of motor 48 so that the pen carriage may not be moved above or below the calibration marks on the chart. To this end, as seen in Figure 14, a drive member 226 is formed as a projection on the pinion 227 that is placed on the motor shaft. Rotatable on the shaft 202 and reading from left to right are a series of parts that are driven by the member 226 and which serve to act as a stop to limit rotation of the shaft 202. These members are, part 228 having a lug 229 extending upwardly therefrom, bent member 231, one end of which extends to the right and one end of which extends to the left. There is also a second part 232 having a lug 233, a second bent member 234, a third part 235 having a lug 236 and a third bent member 237. It will be seen that as the shaft 202 is rotated, the drive member 226 will move part 228 until its lug 229 engages one bent over portion of member 231. The latter member will then be driven by part 228 and its bent over end extending to the right will engage the lug 233 on part 232 to drive the latter. In this manner, one of these members after the other will be picked up until such time as the arm extending from the right of member 237 engages the lower end of a screw 238 that extends into the housing 203. This positively stops the shaft 202. Upon a reverse rotation of the motor 48, the various parts will be picked up in sequence and rotated in the opposite direction until the member 237 engages the other side of screw 238 to positively stop the rotation of the shaft in that direction. The screw 238 is formed with a conical end so that by moving it further into or out of the housing 203 the shaft 202 will be permitted to rotate more or less. This is an adjustment which will permit a definite limiting of the end of the movement of the pen carriage with the writing tip of the pen at the edge of the chart calibration marks.

When moving the chart from beneath the pen after a record has been made, it is necessary to lift the pen up away from the chart so that it will not make an undesirable line thereon. This may be done by moving a bar member 239 in Figure 11 clockwise around shaft 162 into engagement with the rear ends 138 of the pen frame. Such engagement will pivot the pen around shaft 139 and raise its writing tip out of engagement with the chart. The member 239 consists of a bar which has its ends bent over as shown in Figure 9 and perforated so that they may be received by the shaft 162. This bar is located vertically along the shaft by means of a collar 241 that surrounds the lower part of the shaft and extends between the bar 239 and the pinion 174. The bar is rotated around shaft 162 by means of an eccentric 242 which is received between the arms of a yoke 243 that is attached to the upper end of the bar 239. Rotation is imparted to the eccentric by a shaft 244 upon which it is slidably received, the shaft extending transversely of the chassis. It will be seen that the shaft has a flat on it so that as it is rotated, the eccentric will be rotated. The frame is provided with a pair of brackets 245 that are attached to the lower surface of plate 159, which brackets engage the ends of the eccentric to move it along shaft 244 as the frame moves.

Shaft 244 is held in its rotated positions by means of a mechanism which is shown in detail in Figure 12, and which is mounted on the upper right hand portion of the chassis. With reference to Figure 12, it will be seen that the shaft 244 has a pinion 246 on its end, which pinion engages a rack that is formed on the upper surface of a sleeve 247 received in a suitable bracket on the end of the chassis. Extending through and supporting the sleeve is a shaft 248 which shaft is journaled in the bracket. The sleeve 247 and its rack are normally held in the position on the shaft 248 that is shown in Figure 12, by means of a spring 249 which surrounds the shaft and which bears with one end against an enlargement 251 on the sleeve and with its other end against a head 252 on the shaft. The assembly consisting of the shaft and the sleeve may be moved to the right from their normal position shown against the tension of a spring 253 that bears with one end against the bracket and with its other end against a push button 254. The left limit to which the shaft can be moved is determined by a stop 255 that engages the head 252 on the shaft. A catch to hold the sleeve in its right position is provided by a lever 256, which is pivoted at 257 and which is biased in a counterclockwise direction in Figure 12 by means of a spring 258 to a position limited by engagement between the opening 259 formed in the lever and a pin 261 projecting from the chassis 4. Lever 256 has formed on its upper surface a projection 262 and has pivoted at 264 on its right end a pawl 263. This pawl is biased in a clockwise direction by a spring 267 to bring a pin 265 on it into engagement with a pin 266 on the lever.

In the operation of this mechanism, the button 254 is pushed to the right until head 251 on the sleeve engages behind the projection 262 on lever 256. In this position shaft 244 has been rotated and, through eccentric 242 and yoke 243, the bar 239 has been moved so that it is against the end 138 of the pen frame. The writing point of the pen is therefore moved out of engagement with the chart. When the button 254 is again pushed, the head 253 will bear against the upper end of pawl 263, camming the lever 262 in a clockwise direction in Figure 12 far enough to permit the projection 262 to move below the head 251. When this happens, spring 249 will move the sleeve and its rack 247 to the left rotating shaft 244 so that the bar 239 will be moved away from the ends 138 on the pen, permitting the pen point to move toward the chart under the force of spring 157. It will be seen that if the button 254 is pushed all the way, head 252 will move the lever 256 clockwise while 251 moves to the right of projection 262. On the return movement of shaft 248, the left face of the head 252 will engage the right face of pawl 263 and rotate the latter against its spring tension around its pivot 264. Since the lever 256 is not moved, shaft 248 returns to the left and head 251 will stay behind the projection 262. Thus it will be seen that a movement of the button 254 all the way to the right will operate the mechanism to lock head 251 behind the projection 252 and raise the pen from the paper while movement of the button 254, only a portion of the way to the right, will effect the release of the sleeve 247 so that the pen will be moved against the chart.

As was pointed out above, the instrument must be standardized from time to time to compensate for decrease in the voltage of the batteries 13. This is done by connecting the standard cell 50 into the circuit and by adjusting the rheostats 16 and 29 to recalibrate the potentiometer network. The rheostats 16 and 29 are similar in construction and are mounted on the back of the chassis near the bottom thereof. This construction is shown in detail in Figure 15 wherein it will be seen that each of the resistances is of the so-called vernier type and comprises a fine winding 268 and a coarse winding 269 that are mounted on discs which are rotatable around a shaft 271. These windings are adjusted with respect to contacts 270 by means of a gear 272 for resistance 16 and a gear 273 for resistance 29. The gear 272 is provided with a rod 274 that projects therefrom through a hole in the disc for winding 268 and through a slot formed in the disc for winding 269. In this fashion as the gear 272 is rotated, the winding 268 will be moved immediately but the winding 269 will not be moved until after the rod 274 has been moved through the length of the slot formed in its disc. Thus upon the adjustment of the rheostat the coarse winding will not be moved until the adjustment provided by the fine winding has been used up. The gear 273 is provided with a pin 275 that cooperates with the discs upon which the resistances of the rheostat 29 are wound.

The gears 272 and 273 are rotated by means of gears 276 and 277, respectively, which are rotatable around a shaft 278 and which are maintained in their position relative to the gears 272 and 273 by holding members 279 and 281 respectively. These members are attached to the framework and engage in grooves formed in hubs of the gears. Shaft 278 is rotated by the motor 48 through gearing which extends between the pinion 227 of the motor shaft and a gear 282 which is mounted on the shaft 278. Rotation of the shaft 278 is imparted to the gears 276 and 277 by means of the clutches 56 and 63 that have been mentioned above. These clutches consist of discs that are keyed to and slidable on the shaft 278 and which are resiliently pressed toward the outer face of the gears 276 and 277, respectively, by springs 283 and 284. The opposite ends of these springs are held in position on the shaft by suitable collars. Shaft 278 is moved axially to the left to bring clutch disc 56 into engagement with the face of gear 276 by means of a shaft 285 that is journaled in a suitable frame 286 attached to the chassis. This shaft 285 is normally held in its position shown by means of a spring 287 that surrounds the shaft 285 and is received in a recess in the frame 286. This spring bears against a button 288 on the outer end of the shaft 285. Connection is made between the shafts 285 and 278 by means of a collar 289 that is attached to the end of the shaft 278 and which receives the end of shaft 285. As best shown in Figure 15, the shaft 285 is formed with a groove in its end, which groove receives a set screw 291 extending through the collar 289. By means of this connection, axial movement may be imparted to the shaft 278 but that shaft can rotate without rotating shaft 285. Shaft 278 is moved to the right to bring clutch disc 63 into engagement with the adjoining face of gear 277 by means of a shaft 292 that is also journaled in the frame 286. The shaft 292 is held in the position shown by means of a spring 293 that engages with a button 294 formed on the end of the shaft. It will be seen from the drawing that shaft 292 is formed on its upper side with a rack that meshes with a pinion 295 that also meshes with a rack formed on the lower side of shaft 285. Thus, when the button 294 is pushed to the left, pinion 295 is rotated clockwise and the shafts 285 and 278 are moved to the right to close clutch 63.

In order to properly standardize the instrument, it is necessary to simultaneously shift the switch 20 when clutch 56 is closed and shift the switch 37 when clutch 63 is closed. The left end of shaft 292 is used for this purpose. Referring to Figure 5 of the drawing, it will be seen that this shaft is formed with a cam surface 296 that will move the switch operating button 298 to the left when shaft 292 is moved upwardly in Figure 5, or to the right in Figure 15. Shaft 292 is also formed with a cam surface 297 that will move the actuating button 299 for switch 37 to the right when shaft 299 is moved downwardly in Figure 5 or to the left in Figure 15. Thus it will be seen that when the buttons are pushed to close clutch 56, switch 20 will be thrown, and when clutch 63 is closed switch 37 will be thrown. Any unbalance in the potentiometer circuits due to diminishing battery voltage will be compensated for by the motor 48 as it rotates and adjusts the resistances 16 or 29 respectively.

At times it may be desirable to have several records on one chart, for example, to plot several pressures against a single temperature. If so, some means of identifying the various records is required. This can be accomplished by giving a distinctive jog or movement to the pen as it moves across the chart in making each record. Figure 17 shows the kind of records that may be made following this method. For example, record A is a single straight line that does not have any interruptions in it. Record B is a line that has single humps or jogs made in it as the pen crosses the calibration marks for 20, 40 and 60. Record C has similar humps in it when the pen crosses record marks for 10, 30 and 50. Record D has double humps in it as the pen crosses calibration marks 20, 40 and 60. Record E has double humps in it as the pen crosses one of the calibration marks 10, 30 and 50. Record F has a hump made in it each time the pen crosses one of the calibration marks 10 to 60 inclusive. This may be accomplished by paralleling one of the calibrating resistances 301 in the potentiometer network that controls the vertical movement of the pen with another resistance 302. The resistance 302 can be made adjustable, and in this way the height of the humps placed in the various records may be adjusted.

The instrument is manually connected to the six pressures by any suitable means and at the same time a switch shown in Figure 16 is adjusted. This switch has twelve contacts, *a* to *l* inclusive, which contacts are connected by means of a brush 303 to a commutator shown generally at 304. This commutator, as is shown in Figures 3 and 5, is mounted on the lower rear portion of the chassis 4 of the instrument and is driven through gearing 315 by the motor 27 that moves the pen in a horizontal direction. The commutator consists of three rings 305, 306 and 307, the first two of which are engaged respectively by brushes 308 and 309 on one side and all three of which are engaged by brushes 311, 312 and 313 respectively at diametrically opposite points. These commutator rings are mounted on a shaft 314 that is journaled for rotation in the chassis 4 and is driven by the above mentioned gearing 315. The brushes are insulated from each other and from the chassis by being mounted on an insulating block 316 that is held in place above the commutator by a bracket 317.

Referring to Figure 16 of the drawing it will be seen that ring 307 of the commutator is conducting around its entire surface. Ring 306 is conducting for only a short length of its surface and ring 305 is formed with a similar short conducting surface that is displaced circumferentially by a small amount from the conducting surface on ring 306. The conducting portions of rings 305 and 306 are electrically connected to ring 307. The conducting portions of rings 305 and 306 are also placed with respect to the contacts engaging them and with the motor 27 that they will be engaged by contacts 308 and 309 as the pen passes calibration marks 10 and 30 and 50 across the chart, and will be engaged by contacts 311 and 312 as the pen passes calibration marks 20, 40 and 60 across the chart.

If record A is to be made, brush 303 will be shifted to engage contacts *a* and *g*. Since these contacts are not connected to anything the resistance 301 will not be disturbed and a smooth line will be drawn. If record B is to be made, brush 303 will engage contacts *b* and *h*, the latter of which is connected to brush 312. Therefore as the pen is moved and the commutator rotated resistance 302 will be placed in parallel with resistance 301 when the pen is at 20, 40 and 60 across the chart so that a hump will be placed in the record at these points. If record E is to be made, brush 303 will engage contacts *c* and *i* that are connected respectively to brushes 308 and 309. Therefore, when the conducting portions 305 and 306 pass under the brushes 308 and 309 as the pen crosses calibration marks 10, 30 and 50 on the chart resistance 302 will be placed in parallel with resistance 301 to put humps in the record as shown in Figure 17. Records C, D, and F are made in similar fashion. When record C is made brush 303 engages contacts *l* and *f*. When record D is to be made brush 303 engages contacts *d* and *j*, and when record F is to be made brush 303 engages contacts *e* and *k*.

The general operation of the device should be apparent from the above detailed description. The instrument is adapted to make a graph of two variable conditions, and in so doing uses two potentiometer networks, one of which is unbalanced as the vertical component of the graph changes and the other of which is unbalanced when the horizontal component of the graph changes. Thus, the pen can be moved across the chart in response to variations in the variables. The instrument is compact and the various parts are readily accessible for adjustment and repair.

While in accordance with the provisions of the statutes, I have illustrated and described the best form of this invention now known to me, it would be apparent to those skilled in the art that changes may be made in the form of the apparatus disclosed without departing from the spirit of this invention as set forth in the appended claims, and that in some cases certain features of this invention may sometimes be used to advantage without a corresponding use of other features.

Having now described this invention, what I claim as new and desire to secure by Letters Patent is:

1. In a recording instrument having a stationary chart upon which records of the values of several conditions may be made, a recording element, first means to move said element across the chart in response to the value of any one of several conditions, second means to move said recording element across the chart at an angle to the direction in which it is moved by said first means, and means correlated with the position of said element to operate said second means at predetermined points in the path of said element as it is moved by said first means, said predetermined points being different depending upon which of the several conditions said element is recording.

2. In a recording instrument having a stationary chart upon which the records of the values of a plurality of conditions may be made, a recording element, a first means operable in response to the value of any one of a number of conditions to move said element across the chart, a second means to move said element across the chart at an angle to the direction it is moved by said first means, means correlated with the position of said element to operate said second means when said first means has moved said element to various predetermined points across the chart depending upon which condition said first means is responding to.

3. In a recording instrument having a stationary chart upon which records of the values of a plurality of conditions may be made, a recording element, a first means to move said element across the chart, mechanism to operate said means in response to the value of a condition, a second means to move said recording element across the chart at an angle to the direction in which it is moved by said first means, actuating means for said second means, means to synchronize the operation of said actuating means with the operation of said mechanism whereby said element will be moved at said angle at predetermined points across the chart, and means to change said predetermined points depending upon what condition said mechanism is responding to.

4. In a recording instrument having a chart upon which the record of the value of a condition may be made, a first balanceable electrical network operative to be unbalanced in response to variations in the value of the condition, a recording element, a first means to move said recording element across the chart in response to unbalance of said first network, a second balanceable electrical network, means operated in response to unbalance of said second network to move said element across the chart at an angle to the direction it is moved in response to unbalance of said first network, and means synchronized with the operation of said first means to unbalance said second network a predetermined amount when said element is at predetermined points across the chart.

5. In a recording instrument having a chart upon which records of the values of a plurality of conditions may be made, a recording element, a first means to move said element across the chart in response to the value of any one of a plurality of conditions, a balanceable electrical network having resistors in it, a separate resistor, means to insert said separate resistor in parallel with one of said network resistors to unbalance said network, means responsive to unbalance of said network to move said element at an angle to the direction in which it is moved by said first means, a commutator, brushes cooperating therewith connected to said resistors to connect said resistors in parallel as said commutator rotates, means to rotate said commutator by said first means, and means to connect said commutator and said brushes in different circuits to vary the times at which said resistors are placed in parallel.

6. In a recording instrument, a first balanceable electrical network including a first slidewire and a contact movable thereover to a position in which said network is balanced, a second balanceable electrical network including a second slidewire and a contact movable thereover to a position in which said network is balanced, a frame movable through a path, means responsive to unbalance of said second network to move said frame through said path, said second slidewire being mounted adjacent said path and the contact therefor being mounted on said frame so that the contact will be moved along the slidewire to a position in which said second network is balanced, a carriage mounted for movement on said frame in a direction at an angle to said path, the slidewire for said first network being mounted on said frame parallel to the path of movement of said carriage, the contact for said first slidewire being mounted on said carriage for movement therewith along the slidewire to a position in which said first network is balanced, and a recording element carried by said carriage whereby it will be moved to a position dependent upon the balanced position of said two networks.

7. In a recording instrument, the combination of a frame, means to move said frame through a path to positions proportional to the value of a variable condition, guide means on said frame, an elongated resistance element pivoted to said frame and extending parallel to said guide means, a carriage mounted on said frame for movement thereon through a path guided by said guide means, a recording element pivoted to said carriage, means on said carriage to bias said recording element in a direction toward a chart upon which it is to make a record, a contact mounted on said carriage and extending toward said resistance element, means to hold normally said resistance element in a position to engage said contact as said carriage moves, and means to move said carriage to various positions along said frame in response to variations in a second variable condition.

8. In a recording instrument, the combination of a frame, means to move said frame through a path to various positions, guide means on said frame, a carriage mounted on said guide means, means to move said carriage to various positions along said frame, a recording element mounted on said carriage, a contact mounted on and extending outwardly from said carriage, an elongated resistance, means to pivotally mount said resistance on said frame so that it extends parallel to said guide means, and means to hold normally said resistance in position to be engaged by said contact as said carriage moves.

9. In apparatus for recording the values of a plurality of variable conditions on a stationary chart, a first balanceable electric network operative to be unbalanced in response to variations in the value of a selected one of the conditions, a recording element in continuous contact with the chart, a first motor operative to move said element across the chart in response to unbalance of said first network, a second balanceable electric network, a network-constant-varying component operative to unbalance said second network when connected thereto, a second motor operative to move said element across the chart at an angle to the direction in which it is moved in response to unbalance of said first network and to thereby make an identifying mark in the graph traced by said element, said second motor being responsive to unbalance of said network, and an electric-circuit-maker-and-breaker mechanically connected to said first motor so as to be driven thereby to circuit-making-and-circuit-breaking positions so as to connect and disconnect said component to and from said second network.

10. In apparatus for recording the values of a plurality of variable conditions on a stationary chart, a first balanceable electric network operative to be unbalanced in response to variations in the value of a selected one of the conditions, a recording element in continuous contact with the chart, a first motor operative to move said element across the chart in response to unbalance of said first network, a second balanceable electric network, a network-constant-varying component operative to unbalance said second network when connected thereto, a second motor operative to move said element across the chart at an angle to the direction in which it is moved in response to unbalance of said first network and to thereby make an identifying mark in the graph traced by said element, said second motor being responsive to unbalance of said second network, an electric-circuit-maker-and-breaker mechanically connected to said first motor so as to be driven thereby to circuit-making-and-circuit-breaking positions so as to connect and disconnect said component to and from said second network, and manually operable mechanism for selectively varying the circuit-making-and-breaking positions of said circuit-maker-and-breaker.

11. In apparatus for recording the values of a plurality of variable conditions on a stationary chart, a first balanceable electric network operative to be unbalanced in response to variations in the value of a selected one of the conditions, a recording element in continuous contact with the chart, a first motor operative to move said element across the chart in response to unbalance of said first network, a second balanceable electric network, a network-constant-varying component operative to unbalance said second network when connected thereto, a second motor operative to move said element across the chart at an angle to the direction in which it is moved in response to unbalance of said first network and to thereby make an identifying mark in the graph traced by said element, said second motor being responsive to unbalance of said second network, an electric circuit-maker-and-breaker mechanically connected to said first motor so as to be driven thereby to circuit-making-and-circuit-breaking positions so as to connect and disconnect said component to and from said second network, and a second electric-circuit-maker-and-breaker manually operable to select contacts of said first circuit-maker-and-circuit-breaker and to connect said contacts in series with said first circuit-maker-and-breaker.

12. In apparatus for recording as a graph on a stationary chart the values of each of a plurality of variable conditions, a first balanceable electric network operative to be unbalanced in response to variations in the value of a selected one of said conditions, a recording element in continuous engagement with the chart, a first motor operative to move said element across the chart in response to unbalance of said first network, a second balanceable electric network, a network-constant-varying component operative to unbalance said second network when connected thereto, a second motor operative to move said element across the chart at an angle to the direction in which said element is moved in response to unbalance of said first network and to thereby make an identifying mark in the graph traced by said element, said second motor being responsive to unbalance of said second network, means driven by said first motor to connect and disconnect said component to and from said second network, and manually operable means to vary the times at which said first means connects and disconnects said component.

13. In apparatus for recording the values of each of a plurality of variable conditions as a set of continuous lines on a stationary chart, a pen movable across the surface of said chart in continuous contact therewith, a first motor mechanically connected to said pen to move it in one direction, a second motor mechanically connected to said pen to move it in a direction at an angle to the direction in which it is moved by said first motor, periodically operating means mechanically connected to and driven by said first motor to activate and inactivate said second motor, and manually operable means operatively connected to said periodically operated means so as to vary the times at which said second motor is activated and inactivated.

14. In apparatus for recording in sequence on a single chart the values of each of a plurality of variable conditions, each condition having a different characteristic, each record being a continuous line graph, recording means moved across the chart in continuous contact therewith in response to a selected one of said conditions, and means selected in correspondence with the condition being recorded and operable to move said recording means in continuous contact with said chart at an angle to the direction in which said recording means is moved in response to said selected condition to place an identifying mark in the record of the condition being recorded.

15. In apparatus for recording successively the values of each of a plurality of different characteristics, recording means for recording the values of a characteristic by a continuous line, selecting means for connecting in succession each of a plurality of characteristics to said recording means, and identifying means responsive to said selecting means to move said recording means at an angle to the direction in which said recording means are moved in response to said characteristic to place a mark identifying the characteristic being recorded in the line forming the record of that characteristic.

GEORGE W. BARNES, Jr.

References Cited in the file of this patent

UNITED STATES PATENTS

| Number | Name | Date |
|---|---|---|
| 1,322,148 | Sprague | Nov. 18, 1919 |
| 1,471,129 | Holt | Oct. 16, 1923 |
| 1,685,973 | Alexander et al. | Oct. 2, 1928 |
| 1,687,555 | Gasiorowski | Oct. 16, 1928 |
| 1,784,522 | Harrison | Dec. 9, 1930 |
| 2,118,081 | Grisdale | May 24, 1938 |
| 2,277,427 | Woodson | Mar. 24, 1942 |
| 2,388,105 | Wilson | Oct. 30, 1945 |
| 2,391,912 | Magee | Jan. 1, 1946 |
| 2,392,916 | Gruss | Jan. 15, 1946 |
| 2,489,253 | Andre | Nov. 29, 1949 |